Aug. 20, 1929.  E. TERRELL  1,724,980
VEGETABLE OR LIKE PEELING KNIFE

Filed Sept. 20, 1927

INVENTOR

Patented Aug. 20, 1929.

1,724,980

UNITED STATES PATENT OFFICE.

EDWARD TERRELL, OF LONDON, ENGLAND.

VEGETABLE OR LIKE PEELING KNIFE.

Application filed September 20, 1927, Serial No. 220,716, and in Great Britain February 12, 1927.

This invention is for an improved vegetable or like peeling knife, and has for one of its objects to provide a simple and cheap construction of knife which will peel the articles with the least possible amount of waste.

According to the present invention there is provided a knife for peeling vegetables or the like, having a detachable flexible blade (for example a razor blade) with means which in clamping the blade in operative position bend it from its normal shape.

A knife for peeling vegetables or the like has been proposed having a detachable blade which in operative position is located with its cutting edge spaced away from a guide intended to bear on the article to be peeled and between which guide and the cutting blade the parings pass.

The knife according to the present invention may also embody this construction, but, as already indicated, the detachable blade in the knife according to the present invention is flexible (for example is a razor blade) and the means for clamping the blade in operative position bend it from its normal shape. Preferably the direction of curvature of the blade when in operative position is such as to curve the cutting edge and present a concave surface of the blade to the convex surface of the article to be peeled. Thus although, as in safety razors, the blade is bent from its normal shape, the direction of curvature differs from that in razors, since in the latter the cutting edge is not curved.

According to the invention the detachable blade is clamped between a main support and a cover plate, which latter is hinged at one end to the main support and is provided with fastening means at its other end for securing it to the main support.

Where the said detachable blade is formed with two parallel cutting edges so as to be reversible, it is a feature of the invention to arrange that parts of the mounting for the detachable blade project beyond both edges of the latter throughout the full length thereof when the blade is in operative position and permit the blade to be safely encircled by the hand. That is to say if the user grasps the knife around the blade his flesh will not encounter the edge of the blade but will bear upon the mounting.

According to a further feature of the invention the aforesaid guide is curved longitudinally to follow the shape of the cutting edge of the blade and is also curved in transverse section to present a convex surface to the parings. The latter will thus be able to pass easily between the guide and the blade.

For a more complete understanding of the invention there will now be described, by way of example only and with reference to the accompanying drawings, one constructional form of vegetable or like peeling knife according to the invention. It is to be understood, however, that the invention is not restricted to the precise constructional details set forth.

In these drawings:—

Like reference numerals indicate like parts throughout the drawings.

Figure 4:
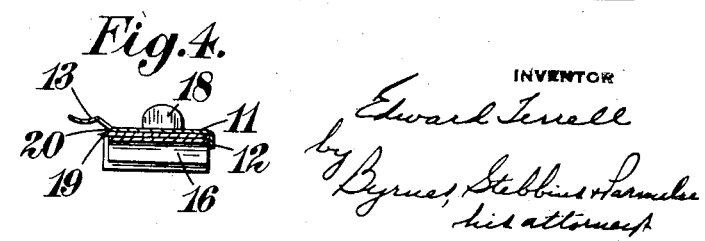
Figure 4 is a transverse section on the line 4—4 of Figure 2.

Into a wooden or other handle 10 there is fastened a main supporting plate 11 which is curved longitudinally but is flat in cross-section except that along one edge it is formed with a flange 12. At its opposite edge there is fixed to the plate 11 a guide 13 which, as will be clear from Figure 4, is spaced a distance away from the plate 11. The extremity of the main plate is formed with a sharpened prong 14 for removing eyes or damaged parts from the articles being peeled, and there is also a slit 15 for a purpose to be indicated hereinafter.

Figure 1:
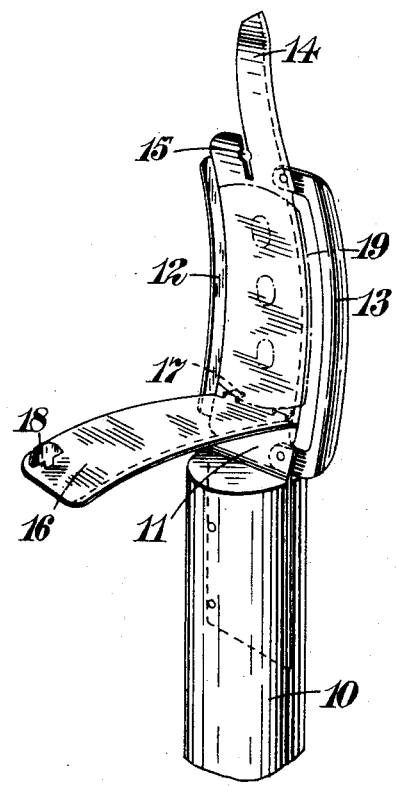
Figure 1 is a perspective view of the knife showing the cover plate open and showing in chain lines the position occupied by the detachable blade.
Figure 2:
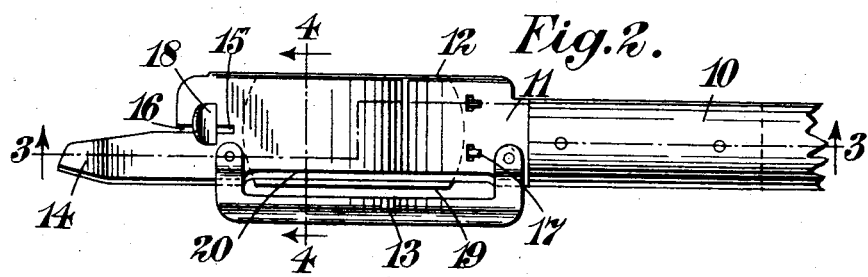
Figure 2 is an outside view showing the parts in their operative position.
Figure 3:
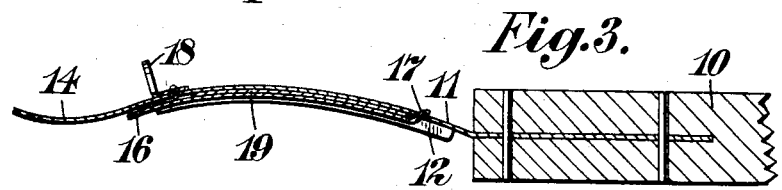
Figure 3 is a longitudinal section on the line 3—3 of Figure 2.

The cover plate 16 has two bent hinging lugs 17 which are adapted to reach through slots in the main supporting plate 11 and the cover plate 16 also carries a turnbutton 18 which can pass through the slit 15 aforesaid and be thereafter turned into the position shown in Figure 2 in order to retain the cover plate in operative position. The plate 16 is flat in cross-section but is curved longitudinally to conform to the shape of the main supporting plate 11.

The detachable blade 19, say a used or faulty razor blade, is of course normally flat but when placed in operative position it will be bent by the plates 11 and 16 and its cutting edge will be thus quite stiff.

Moreover, due to its concavity it will approximate to the convex surface of the article being peeled and with the guide 13 bearing upon the surface of the said article the parings will be passed easily between the blade and the guide, the convex surface of the guide facilitating easy passage and the edge 20 of the plate 11 being also chamfered for this purpose. The knife edge 20 also extends to the extremity of the prong 14. The blade 19 illustrated has two opposite parallel cutting edges and when it is in operative position the one edge will be masked by the flange 12 while the guide 13 will project sufficiently far beyond the full length of the other edge of the blade to prevent the user's hand being cut if he happens to grasp the knife around the blade, say in using the prong 14 to dig eyes out of a potato.

It is to be understood that the invention is not restricted to the precise constructional details set forth.

I claim:—

A knife for peeling vegetables or the like having a detachable flexible razor blade formed with two parallel cutting edges and a mounting for the blade comprising a slotted main support whereof one edge is flanged and the opposite edge has a guide intended to bear on the article to be peeled, which flange and guide project beyond the edges of the blade throughout the full length thereof when the blade is in operative position and permit the blade to be safely encircled by the hand, which main support is curved in the direction of the length of the guide, a curved cover plate which clamps the blade in operative position against the main support and in doing so bends it from its normal shape and curves its cutting edge so as to present a concave surface of the blade to the convex surface of the article to be peeled, lugs at one end of the cover plate to engage in slots in the main support and detachably hinge the cover plate in position and a turn button at the other end of the cover plate to cooperate with a slot in the main support for securing the cover plate thereto.

In testimony whereof I affix my signature.

EDWARD TERRELL.